(12) United States Patent
Drokov et al.

(10) Patent No.: US 8,943,548 B2
(45) Date of Patent: Jan. 27, 2015

(54) SYSTEM AND METHOD FOR DYNAMIC MULTIFACTOR AUTHENTICATION (75) Inventors: Igor Drokov, Cambridge (GB); Elena Punskaya, Cambridge (GB); Emmanuel Tahar, Cambridge (GB)

(73) Assignee: VASCO Data Security, Inc., Oakbrook Terrace, IL (US)

( * ) Notice: Subject to any disclaimer, the term of this patent is extended or adjusted under 35 U.S.C. 154(b) by 1124 days.

(21) Appl. No.: 12/158,292

(22) PCT Filed: Dec. 20, 2006

(86) PCT No.: PCT/GB2006/004829
§ 371 (c)(1),
(2), (4) Date: Jun. 19, 2008

(87) PCT Pub. No.: WO2007/072001
PCT Pub. Date: Jun. 28, 2007

(65) Prior Publication Data
US 2008/0307515 A1    Dec. 11, 2008

(30) Foreign Application Priority Data
Dec. 21, 2005    (EP) ..................................... 05257924

(51) Int. Cl.
*G06F 21/00*    (2013.01)
*H04W 12/06*    (2009.01)
(Continued)

(52) U.S. Cl.
CPC ............... *H04W 12/06* (2013.01); *G06Q 20/32* (2013.01); *G06Q 20/3224* (2013.01); *G06Q 20/40* (2013.01); *H04L 63/0853* (2013.01); *H04L 63/18* (2013.01); *H04L 63/0442* (2013.01)
USPC .................................... 726/2; 726/5; 380/255

(58) Field of Classification Search
CPC ...... H04W 12/06; G06Q 20/32; G06Q 20/40; G06Q 20/3224; H04L 63/18; H04L 63/0853; H04L 63/0442

USPC .............. 726/3–6, 16–18; 707/652, 654, 803, 707/770, 609
See application file for complete search history.

(56) References Cited

U.S. PATENT DOCUMENTS 5,073,931 A    12/1991  Audebert et al.
5,432,851 A    7/1995   Scheidt et al.
(Continued)

FOREIGN PATENT DOCUMENTS

DE    68929002 T2    7/1993
DE    68929002 T2    5/1999
(Continued)

OTHER PUBLICATIONS

Mizuno et al, Authentication Using Multiple Communication Channels, DIM '05, Nov. 11, 2005, pp. 54-62.
(Continued)

*Primary Examiner* — Lisa Lewis
*Assistant Examiner* — Kendall Dolly
(74) *Attorney, Agent, or Firm* — O'Rourke Law Office, LLC (57) ABSTRACT A method of authenticating a user. The method comprises the step of sending an authentication request to a remote authentication device and generating a first piece of authentication information. A mobile device receives the first piece of authentication information from either an access terminal or the remote authentication device. The mobile device of the user generating a second piece of authentication information which is at least partially based on the received first piece of authentication information. The second piece of authentication information is sent to the remote authentication devices and the second piece of authentication information validated. If the second piece of authentication information is successfully validated an authentication signal is generated.

9 Claims, 8 Drawing Sheets (51) Int. Cl.
  *G06Q 20/32* (2012.01)
  *G06Q 20/40* (2012.01)
  *H04L 29/06* (2006.01)

(56) References Cited

U.S. PATENT DOCUMENTS

| | | | |
|---|---|---|---|
| 5,668,876 | A | 9/1997 | Falk et al. |
| 7,593,605 | B2 * | 9/2009 | King et al. ............... 382/313 |
| 2002/0169988 | A1 * | 11/2002 | Vandergeest et al. ......... 713/201 |
| 2003/0191945 | A1 | 10/2003 | Keech |
| 2004/0148510 | A1 | 7/2004 | Muller et al. |
| 2004/0190718 | A1 | 9/2004 | Dacosta |
| 2004/0266395 | A1 | 12/2004 | Pailles et al. |
| 2005/0044393 | A1 | 2/2005 | Holdsworth |
| 2005/0203854 | A1 * | 9/2005 | Das et al. ................. 705/64 |
| 2005/0268107 | A1 * | 12/2005 | Harris et al. ............. 713/182 |

FOREIGN PATENT DOCUMENTS

| | | | |
|---|---|---|---|
| EP | 0552822 | B1 | 5/1995 |
| EP | 0552822 | B1 | 5/1999 |
| EP | 1102157 | A1 * | 5/2001 |
| EP | 1211841 | A1 | 6/2002 |
| EP | 1211841 | B1 | 1/2006 |
| EP | 1802155 | A1 | 6/2007 |
| FR | 2769446 | A1 | 4/1999 |
| FR | 2771875 | A1 | 6/1999 |
| GB | 2328310 | A | 2/1999 |
| GB | 2362489 | A | 11/2001 |
| GB | 2378294 | A | 2/2003 |
| WO | 9600485 | A2 | 1/1996 |
| WO | 2005001618 | A2 | 1/2005 |
| WO | 2005069658 | A1 | 7/2005 |
| WO | 2005069658 | A2 | 7/2005 |
| WO | 2005098597 | A2 | 10/2005 |
| WO | 2005116909 | A1 | 12/2005 |
| WO | 200707201 | A1 | 6/2007 |

OTHER PUBLICATIONS

Rohs et al, Using Camera-Equipped Mobile Phones for Interacting With Real-World Objects.
McCune et al, Seeing-Is-Believing: Using Camera Phones for Human-Verifiable Authentication; Proceedings of the 2005 IEEE Symposium on Security and Privacy, 2005.
Chip Authentication Program—Functional Architecutre, MasterCard International Incorporated, Sep. 2004.
McCune, Jonathan M. et al., "Seeing-Is-Believing; Using Camera Phones for Human-Verifiable Authentication" Proceedings of the 2005 IEEE Symposium on Security and Privacy, 1081-6011/2005.
MasterCard SecureCode 3-D Secure Chip Authentication Program—Functional Architecture MasterCard International Incorporated, SecureCode Chip Authentication Programme, Jun. 2003.
Rohs, Michael et al., "Using Camera-Equipped Mobile Phones for Interacting with Real-World Objects" Advances in Pervasive Computing. Austrian Computer Society (OCG), 2004 ISSN: 3-85403-176-9: 265-271; Example codes are available at http://www.inf.ethz.ch/_rohs/visualcodes. 2004.
Michael Rohs, et al., Visual Code Recognition for Camera-Equipped Mobile Phones, A Research Project of the Distributed Systems Group, ETH Zurich: Computer Science, Pervasive Computing, Distributed Systems, Research, Visual Codes Oct. 2005.

* cited by examiner

SYSTEM AND METHOD FOR DYNAMIC MULTIFACTOR AUTHENTICATION

The present invention relates to a system and method of dynamically authenticating a user of a communications system. Rapid growth in the areas of online commercial and banking transactions has necessitated the development of various methods of authenticating users of such systems while preventing identity theft.

The vast majority of current online authentication methods use what is known as static single-factor authentication. This scheme involves a user having some form of static login identification (ID) and static password. Using a browser on a local access device such as a personal computer, a user initiates an authentication request with a remote authentication device by first entering a login ID and a password on a web page. The remote authentication device then validates the login ID/password combination and, if valid, produces some sort of authentication signal. Although simple to implement, static single-factor authentication schemes have sever shortcomings and are most vulnerable to two types of attacks.

The first type of attack to which static single-factor authentication is prone is known as "phishing". In this scenario, a malevolent third-party first sets up a website which is designed to look and function like a website in which a user would want to enter authentication information. Then, the third party lures the user to the forged website. This step is usually accomplished by sending an email to a user containing a link to the forged website and including a message designed to pressure the user to immediately take some form of action by login in to their account. The user then enters his or her static login ID and password in the forged website, thereby unwittingly providing their authentication information to the third party.

The second type of attack to which static single-factor authentication is prone is known as "keyboard logging". This attack, although more difficult to set into action, is considerably more effective than "phishing" in that it is virtually undetectable to even the most computer literate user. This type of attack sees a user unwittingly downloading a piece of "spyware" which is either bundled with another piece of software which the user intends to download or is distributed with a virus. Spyware is a piece of software that covertly gathers user information, such as keyboard strokes and information pertaining to websites which a user has visited, and periodically sends this information to a malevolent third party. Such information can then easily be cross-referenced in order to extract the authentication information of a user.

Two-factor authentication has recently been developed in order to overcome the weaknesses associated with static single-factor authentication systems. The "smartcard" was the first of such systems to be developed and is currently being used in most countries in Europe. This system relies on the use of a card comprising a microprocessor which contains information needed to communicate with a smartcard reader. Once the smartcard reader has validated the card itself, a user enters a Personal Identification Number (PIN) into the reader and information is sent to a remote authentication device. Although this solution is more secure than static single-factor authentication systems, smartcards do have considerable disadvantages. Firstly, smartcards necessitate the use of smartcard readers. This all but precludes the use of such a system with simple local access devices such as personal computers. Also, a user must remember a PIN number for each card in his or her possession. A solution to this problem is to for a user to have only one PIN for multiple smartcards. This solution, however, will see the user's PIN being employed in a much wider variety of circumstances, thereby exposing the PIN to more chances of being fraudulently used. If a card and its associated PIN is intercepted, they can freely be used by malevolent third parties.

Another embodiment of a two-factor authentication system employs a user's biometrics to provide a second layer of authentication. For example, systems have been developed which employ the use of thumb print scanner to authenticate a user. These systems, although secure, are very expensive to implement and are therefore not currently deployed commercially. Also, in situations where a user is not supervised, it is possible to replicate thumb prints in order to contravene these systems. Thus, biometric-based systems don't lend themselves well to remote online authentication.

A recent development in the art of user authentication has been the advent of dynamic two-factor authentication. These systems, currently thought to be the most secure of all economically viable options, are based on the use of tokens which pseudo-randomly generate codes. Users of such systems are provided with their own token that usually takes the form of an electronic device which is small enough to be attached to a key ring. The electronic device uses an algorithm to pseudo-randomly produce a series codes which are displayed to the user. For example, a new code could be generated and presented to the user every 60 seconds. A remote authentication device authenticates the user based on a combination of a login ID, password and the current code which appears on the token. Thus, when a user requests authentication, a login ID is entered as well as the password and the current code which appears on the token. However, these systems are still vulnerable to phishing in that a third party, once having captured a code via a forged website, could have up to 60 seconds to login to the real website or indeed authorise a fraudulent transaction using the login name, the password and the current code appearing on the token. Other disadvantages of this method of dynamic two-factor authentication is the need for the user to carry around a token for each institution with which he or she transacts, the bulkiness of the tokens themselves and the high costs involved in manufacturing the tokens. Because of this disadvantage, token-based dynamic two-factor authentication systems, although well known, are not suitable for wide-scale use.

What is needed is an improved system for providing dynamic two-factor authentication.

In order to solve the problems associated with prior art forms of authentication, the present invention provides a method of authenticating a user, the method comprises the steps of:

sending an authentication request to a remote authentication device;

generating a first piece of authentication information;

receiving at a mobile device, the first piece of authentication information from either an access terminal or the remote authentication device;

generating, within the mobile device of the user, a second piece of authentication information which is at least partially based on the received first piece of authentication information;

sending the second piece of authentication information to the remote authentication device;

validating the second piece of authentication information; and, if the second piece of authentication information is successfully validated, generating an authentication signal.

Preferably, the first piece of authentication information contains an authentication code.

Preferably, the first piece of authentication information contains transactional information related to a transaction which the user wishes to make.

The first piece of authentication information may be received at the mobile device from the remote authentication device.

The first piece of authentication information may be received via Short Message Service (SMS), Multimedia Message Service (MMS) or via any other wireless data communication means.

The first piece of authentication information may be captured from a piece of paper using optical acquiring means of the mobile device.

The first piece of authentication information may be received at the mobile device from the access terminal.

The first piece of authentication information may be received using Bluetooth™, Universal Serial Bus (USB) or any other form of local wired or wireless data communication means.

The first piece of authentication information may be captured from the access terminal using an audio acquiring means of the mobile device.

The first piece of authentication information may be captured from a display means of the access terminal using an optical acquiring means of the mobile device.

The authentication information may be captured from the access terminal using a digital camera on the mobile device.

The step of generating the second piece of authentication information may be done using the International Mobile Equipment Identity (IMEI), information relating to the Subscriber Identity Module (SIM) or any other information specific to the mobile device of the user.

The information specific to the mobile device may include an encryption key.

The step of validating the second piece of authentication information may further comprise the steps of:
 receiving information relating to the location of the mobile device; and
 validating the second piece of authentication information only if the information relating to the location of the mobile device indicates that the mobile device is in a predetermined location.

The step of validating the second piece of authentication information may further comprise the steps of:
 receiving information relating to the location of the mobile device;
 receiving information relating to the location of the access terminal;
 comparing the location of the mobile device with the location of the access terminal; and
 validating the second piece of authentication information only if the location of the mobile device matches the location of the access terminal.

The second piece of authentication information may comprise biometric data.

The second piece of authentication information may comprise at least a partial finger print scan of at least one of the user's fingers.

The present invention further provides a system for authenticating a user, the system comprises:
 sending means for sending an authentication request to a remote authentication device;
 generating means for generating a first piece of authentication information;
 receiving means for receiving at a mobile device, the first piece of authentication information from either an access terminal or the remote authentication device;
 generating means for generating, within the mobile device of the user, a second piece of authentication information which is at least partially based on the received first piece of authentication information;
 sending means for sending the second piece of authentication information to the remote authentication device;
 validating means for validating the second piece of authentication information; and
 generating means for generating an authentication signal if the second piece of authentication information is successfully validated by the validating means.

Preferably, the first piece of authentication information contains an authentication code.

Preferably, the first piece of authentication information contains transactional information related to a transaction which the user wishes to make.

The first piece of authentication information may be captured from a piece of paper using optical acquiring means of the mobile device.

The system may be arranged such that the first piece of authentication information is received at the mobile device from the remote authentication device.

The system may be arranged such that the first piece of authentication information is received via Short Message Service (SMS), Multimedia Message Service (MMS) or via any other wireless data communication means.

The system may be arranged such that the first piece of authentication information is received at the mobile device from the access terminal.

The system may be arranged such that the first piece of authentication information is received using Bluetooth™, Universal Serial Bus (USB) or any other form of local wired or wireless data communication means.

The system may be arranged such that the first piece of authentication information is captured from the access terminal using an audio acquiring means of the mobile device.

The system may be arranged such that the first piece of authentication information is captured from a display means of the access terminal using an optical acquiring means of the mobile device.

The system may be arranged such that the authentication information is captured from the access terminal using a digital camera on the mobile device.

The system may be arranged such that the generating means generates the second piece of authentication information using the International Mobile Equipment Identity (IMEI), information relating to the Subscriber Identity Module (SIM) or any other information specific to the mobile device of the user.

The system may be arranged such that the information specific to the mobile device includes an encryption key.

The validating means may further comprise:
 receiving means for receiving information relating to the location of the mobile device, wherein the validating means only validates the second piece of authentication information if the information relating to the location of the mobile device indicates that the mobile device is in a predetermined location.

The validating means may further comprise:
 receiving means for receiving information relating to the location of the mobile device;
 receiving means for receiving information relating to the location of the access terminal;
 comparing means for comparing the location of the mobile device to the location of the access terminal, wherein the validating means only validates the second piece of authentication information if the location of the access terminal matches the location of the mobile device.

The second piece of authentication information may comprise biometric data.

The second piece of authentication information may comprise at least a partial finger print scan of at least one of the user's fingers.

The mobile device may be a hardware token which comprises:
optical input means;
processing means; and
display means.

The mobile device may further comprise:
a finger print scanner.

Thus, the present invention provides several advantages over the prior art. A first of these advantages is that the present invention utilises the ever increasing processing power of ubiquitous mobile devices in order to provide multifactor dynamic authentication. The use of already wide spread mobile devices provides a significant decrease in implementation and maintenance costs. A second of these advantages is that a second authentication factor is sent to the mobile device automatically (e.g. via Bluetooth™ or SMS) or semi-automatically (e.g. via a camera phone). This makes the system of the present invention much easier to use and therefore more marketable. Furthermore, because of the fact that the second authentication factor is entered into the mobile device either automatically or semi-automatically, the system can generate messages with longer codes and a greater amount of transactional information, thereby providing increased security and usability.

Figure 1:
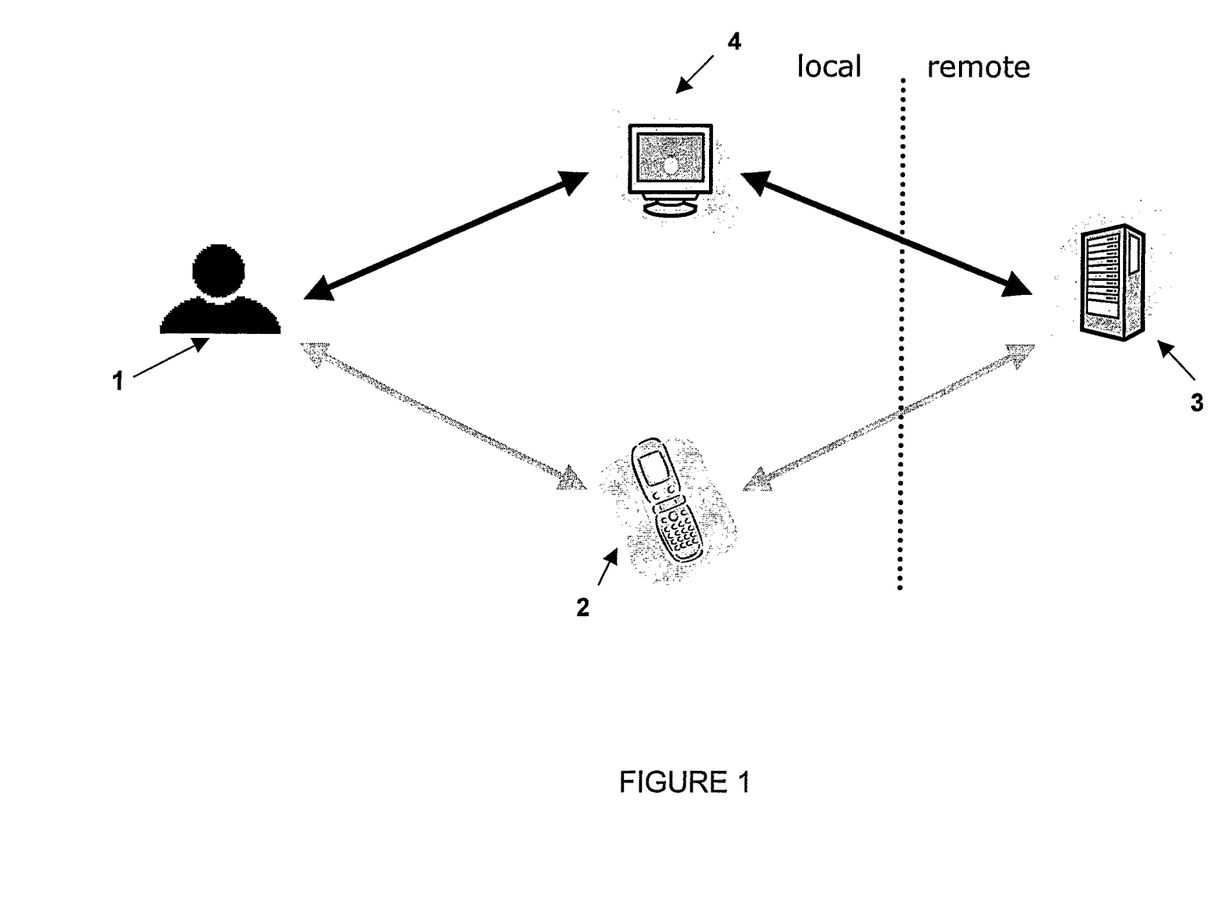
FIG. 1 is a diagram representing an authentication system according to a first embodiment of the present invention.

In reference to FIG. 1, the system of the present invention comprises at least one access terminal 4. The access terminal 4 can be a network connected computer, a Point of Sales (POS) terminal or any other networked device. The system further comprises a remote authentication device 3 such as a network server. Finally, the system comprises at least one mobile device 2 such as a mobile telephone, pager or Personal Digital Assistant (PDA). Alternatively, the mobile device could be a dedicate piece of hardware.

According to a first embodiment of the present invention, a user 1 first makes an authentication request to the remote authentication device 3 via the access terminal 4. The authentication request is associated with a specific transaction which the user 1 wishes to perform. Such transactions can include operations related to banking services, transactions of a commercial nature, logon scenarios or any other transaction in which a user 1, for any reason, would need to be authenticated. Alternatively, an authentication request can be sent to the remote authentication device 3 via the mobile device 2. The remote authentication device 3 then generates a message which is sent either directly to the mobile device 2, using a Short Message Service (SMS) a Multimedia Message Service (MMS) or via any other wireless data communication means (i.e. GPRS, 3G, etc.). In either case, the message is preferably encoded and encrypted and may include information relating to the transaction.

If the message is displayed to the user, the user 1 may then either input the message into the access terminal 4 in order for it to be sent to the remote authentication device 3 or send the message directly to the remote authentication device 3 using the mobile device 2. Alternatively, in another example of the present invention, the message may not be shown to the user 1 and be sent directly to the remote authentication device 3.

In the example of a system where the second message is displayed to the user 1, the user 1 must enter the second message into the access terminal 4 in order for the second message to be communicated to the remote authentication device 3. Once received by the remote authentication device 3, the second message is then validated. If the second message is successfully validated, an authentication signal is generated and may be sent to the access terminal 4 indicating that the user 1 has been authenticated by the remote authentication device 3.

In the example of a system where the second message is automatically sent back to the remote authentication device 3, from the mobile device 2, the user 1 does not need to enter the message in the access terminal 4. As in the previous example, once received by the remote authentication device 3, the second message is then validated. If the second message is successfully validated, an authentication signal is sent to the access terminal 4 indicating that the user 1 has been authenticated by the remote authentication device 3.

The second message may contain further authentication information. Such information could comprise biometric information such as a picture of the face of user or a thumb print which could be processed on either the mobile device or, alternatively, sent directly to the authentication server and processed and validated there. Another example of biometric data could consist of a recording of the users voice, again, for analysis and validation at the mobile device or at the authentication device.

In reference to FIG. 2, a second embodiment of the present invention will now be described. When a user 1 wishes to be authenticated for the purposes of a specific transaction such as a banking or commercial transaction, the user 1 enters his personal information into an access terminal 4 (step S101). This information may be a user 1 name or an account name and a password. The access terminal 4 then sends the personal information of the user 1 to a remote authentication device 3 via a computer network (step 102) along with information pertaining to the specific transaction which the user 1 wishes to perform. The remote authentication device 3 then validates the user name or account name and password of the user 1.

Figure 2:
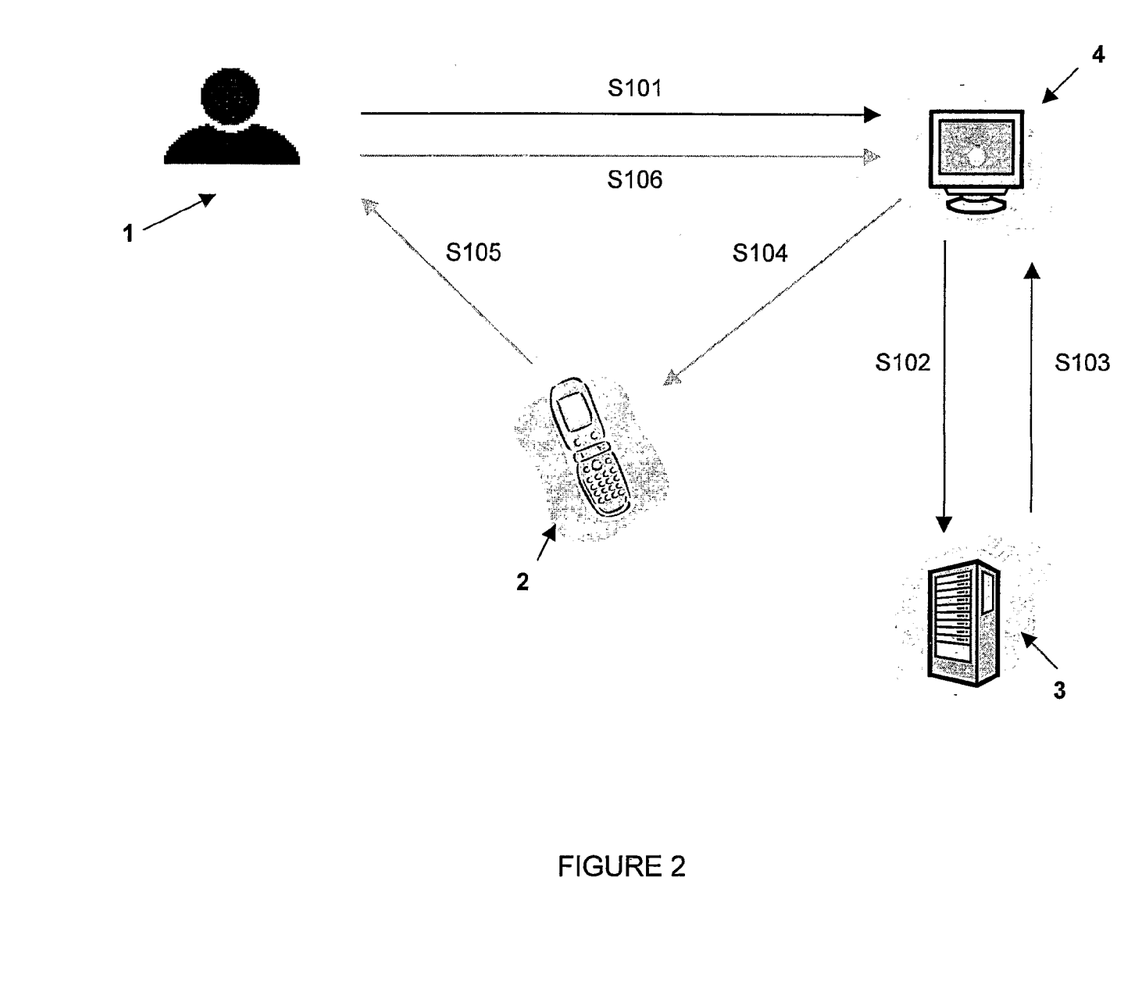
FIG. 2 is a diagram representing an authentication system according to a second embodiment of the present invention.
Figure 3:
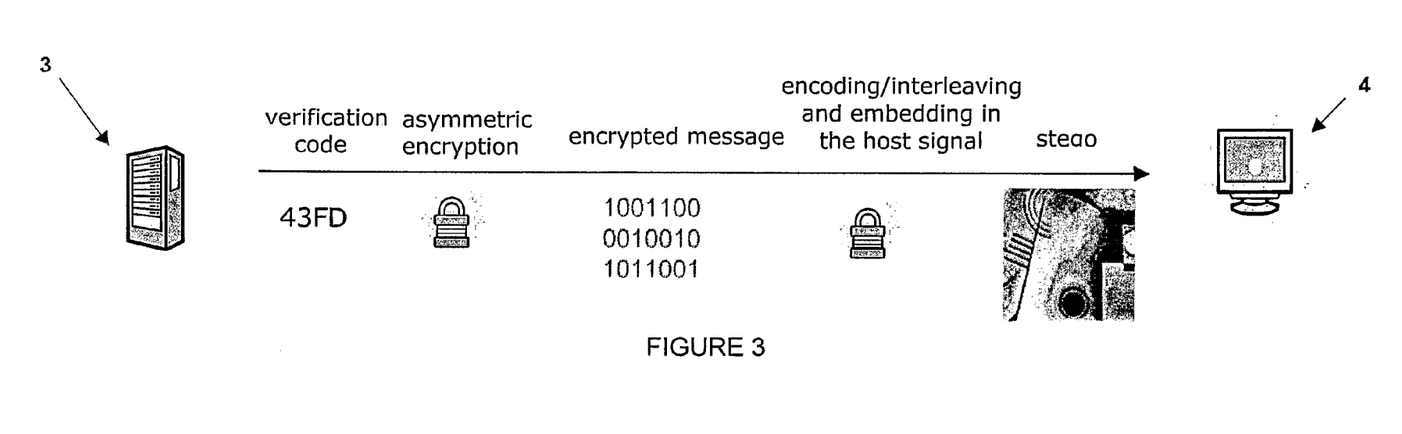
FIG. 3 is a diagram representing the process of carrying out step S103 of FIG. 2.

Now, in reference to FIG. 2 and FIG. 3, if the user 1 or account name and password are successfully validated, the remote authentication device 3 then produces a message which it encrypts and encodes in order to ensure reliable detection. The message may be partially based on a randomly generated code, such as an alpha-numeric code as well as transactional information relating to the requested transaction (e.g. Transfer £100 from account A to account B). Adding transactional information provides a transaction signature that ensures transaction integrity against "man-in-themiddle" attacks such that attackers cannot change the content of the transaction without being detected, dissimilarly to systems relying only on dynamic passwords (e.g. tokens) which are not associated with any form of transaction information.

Finally, the encrypted and encoded message is embedded into a cover signal so that the original signal and modified signal are perceptually indistinguishable. The cover signal could be a sound signal or an image signal. The image signal can be a single image or a sequence of images forming a video signal. The encrypted and encoded signal can be embedded into a cover image signal using any known form of steganography or digital watermarking. Alternatively, the message could be encoded into a visual code where the code itself is the primary data object and no cover signal is used. One of several examples of this is the use of a barcode. Then, the modified signal is sent to the access terminal 4 (step S103).

Figure 4:
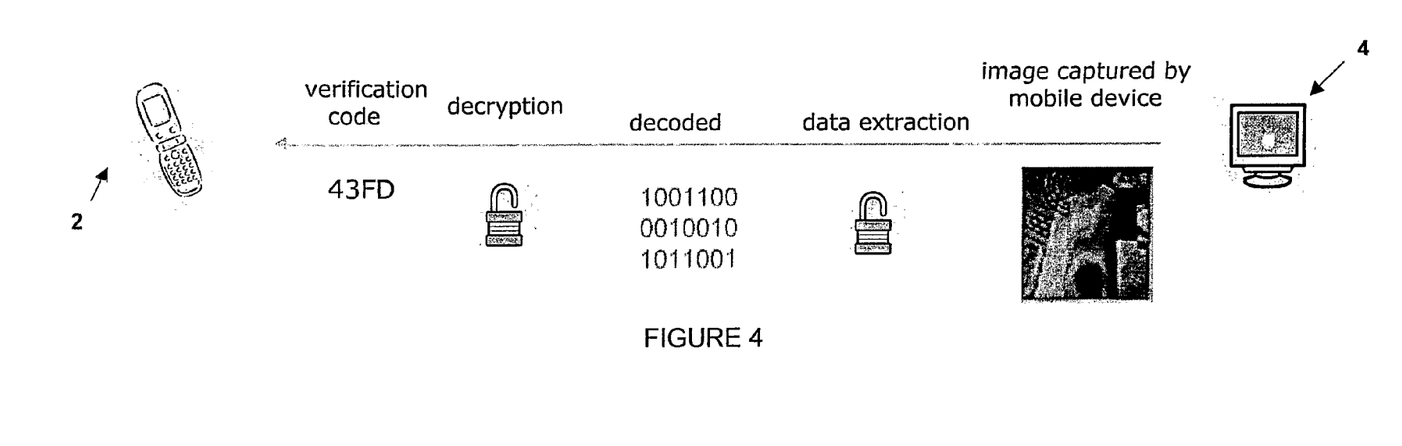
FIG. 4 is a diagram representing the process of carrying out step S104 of FIG. 2.

Now, in reference to FIG. 2 and FIG. 4 and in the case where the modified signal is a digital image signal, the modified signal is displayed on the screen of the access terminal 4, so as to be in clear sight of the user 1. The user 1 then uses the camera on his or her mobile device 2 to capture the image from the access terminal 4 (step S104). Typically, the modified image will be sent to the access terminal by way of a computer network and displayed to the user by means of a web browser. Alternatively, the modified image can be sent to the access terminal by way of email.

In another example of the invention, the modified signal could be sent to the access terminal and subsequently printed out on a piece of paper or any other media which would provide a visual representation of the signal. Alternatively, the modified signal could be sent to the user on a piece of paper in the form of, for example, a letter.

Once the modified signal is captured, the mobile device 2 may authenticate the source of the image. Then, using software installed on the mobile device 2, the image is then processed in order to extract the encoded and encrypted message.

In the case where the modified signal is a digital sound signal, the modified signal is reproduced by the access terminal 4, so as to be audible by the user 1. The user 1 then uses a microphone on his or her mobile device 2 to capture the reproduced digital sound signal (step S104). Using software installed on the mobile device 2, the sound is then processed in order to extract the encoded and encrypted message.

In either of the above cases, the extracted message is decoded and decrypted. The generated code and transactional information is then displayed to the user 1 (step 105). If the user 1 is satisfied as to the correctness of the transactional information, he or she may enter the resulting code into the access terminal 4 (step S106). The code is then sent to the remote authentication device 3 in order to be compared to the code which was originally generated in step S102. If the code matches the code which was originally generated, the user 1 is successfully authenticated. This can be done by, for example, sending an authentication signal to a third party, such as a bank or an online retailer or alternatively, sending an authentication signal to a local client operating on the access terminal 4.

Figure 5:
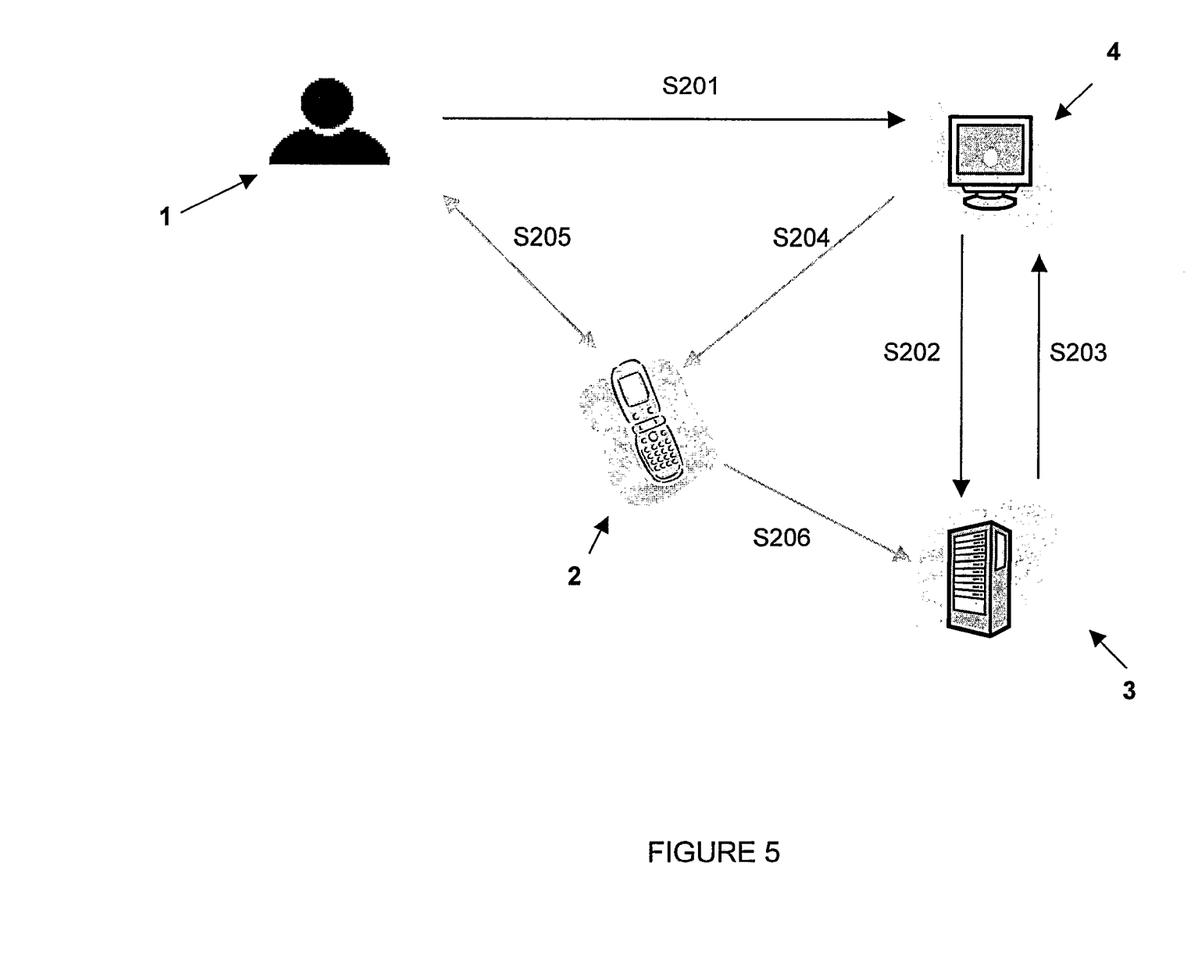
FIG. 5 is a diagram representing an authentication system according to a third embodiment of the present invention.
Figure 6:
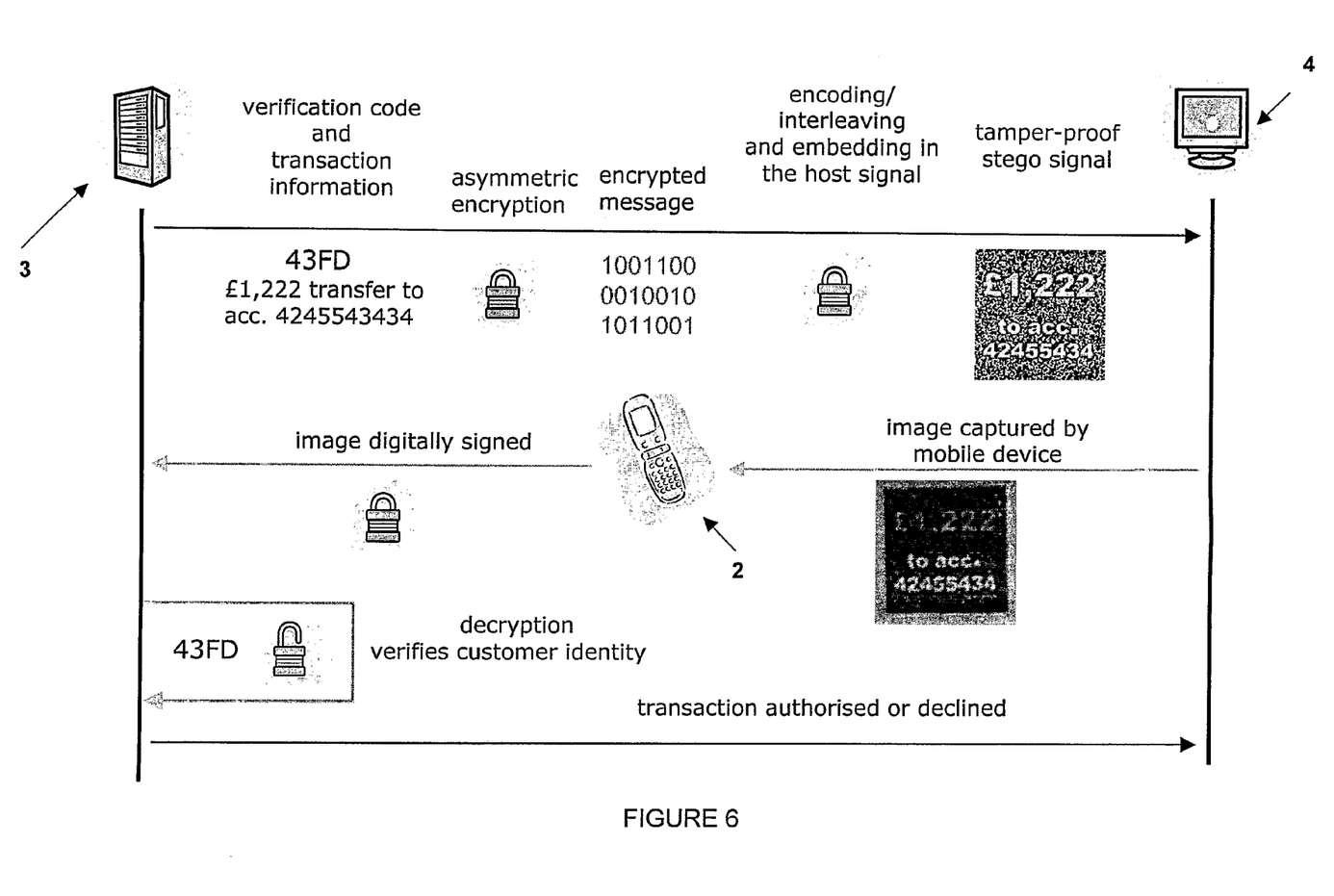
FIG. 6 is a diagram representing the processes involved in carrying out steps S203, S204, and S206 of FIG. 5.
Figure 7:
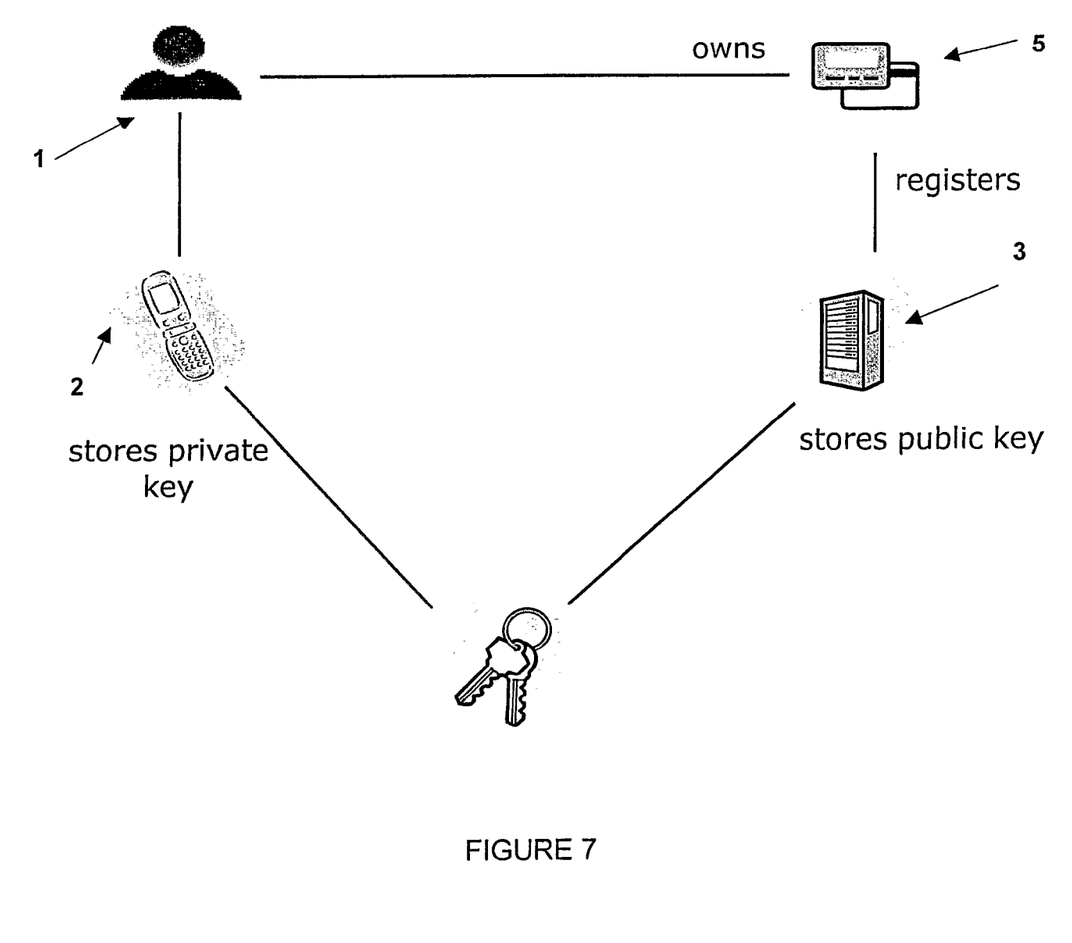
FIG. 7 is a diagram of the possible distribution of security items in an authentication system according to the present invention.

Now, in reference to FIG. 5 and FIG. 6, a third embodiment of the present invention shall be described. In this embodiment, the user 1 enters personal information such as a user 1 name and password into the access terminal 4 (step S201). The personal information is then sent to the remote authentication device 3 via a computer network (step S202) along with details of the transaction which the user 1 intends to perform.

Once received by the remote authentication device 3, the password and user name are validated and, if the validation process is successful, the information pertaining to the transaction is added to a randomly generated code and the resulting message is encrypted, encoded and interleaved. The resulting encrypted and encoded message can then be embedded into either an audible or visual cover signal. If the encrypted and encoded message is embedded into an image signal, any known form of steganography or digital watermarking can be used.

Alternatively, the message could be encoded into a visual code where the code itself is the primary data object and no cover signal is used. One of several examples of this is the use of a barcode.

In both of the above cases, the modified signal is then sent to the access terminal 4 (step S203).

Now, in reference to FIG. 5 and FIG. 6 and in the case where the modified signal is a digital image signal, the cover signal into which the encoded and encrypted message is embedded can be an image containing visual transactional information related to the transaction which has been requested by the user 1 (e.g. "£1,222 to acc. 42455434"). The image may be encrypted in order to be securely delivered to the access terminal. The modified signal is displayed on the screen of the access terminal 4, so as to be in clear sight of the user 1. The user 1 then uses the camera on his or her mobile device 2 to capture the image from the access terminal 4 (step S204). Using software installed on the mobile device 2, the image is then processed in order to extract the encoded and encrypted message, which is displayed to the user 1. In an alternative embodiment, a dedicated integrated circuit (IC) installed in the mobile device could be used for all processing steps.

In the case where the modified signal is a digital audio signal, the cover signal into which the encoded and encrypted message is embedded can be an audio signal containing audible transactional information such as a mechanised voice reading out the sentence "£1,222 to account 4255434". Then, the modified audio signal is reproduced by the access terminal 4, so as to be audible by the user 1. The user 1 then uses the microphone on his or her mobile device 2 to capture the reproduced digital sound signal (step S204). Using software installed on the mobile device 2, the sound is then processed in order to extract the encoded and encrypted message, which is then reproduced so as to be audible to the user 1. Alternatively, the message could be presented to the user in text form.

Then, in both of the above cases, the user 1 of the mobile device 2 is given the choice to either accept the transaction which is being described in the message or refuse it.

The software on the mobile device 2 decodes and decrypts the message, and, if the transaction is accepted by the user, signs the message before sending it to the remote authentication device 3. Alternatively, the software on the mobile device simply digitally signs the message, without decoding and decrypting it, and then sends the signed message to the remote authentication device 3.

If the transaction is refused, the encoded and encrypted message is sent to the remote authentication device 3 without being digitally signed. Alternatively, the encrypted message could not be sent at all and the authentication device would have a timeout function which would cancel any authentication request which took longer than a fixed period of time. The mobile device 2 can send the message to the remote authentication device 3 via any known form of mobile communication (e.g. SMS, MMS, or standard GPRS or 3G).

Other information specific to the mobile device (such as a network operator's ID) could also be added to the signed message. In reference to FIG. 8, one example of the present invention would see the authentication device 3 and the access terminal 4 being connected over the Internet or some other data-communication network. In this example, the authentication device 3 would use information contained in a Internet Protocol packet header to determine the Internet Protocol address of the access terminal 4. Once this is done, the authentication device verify the location of the mobile device 2. Using this information, the authentication device 3 can determine the location of the geographic locations of both the mobile device 2 and the access terminal 4.

Figure 8:
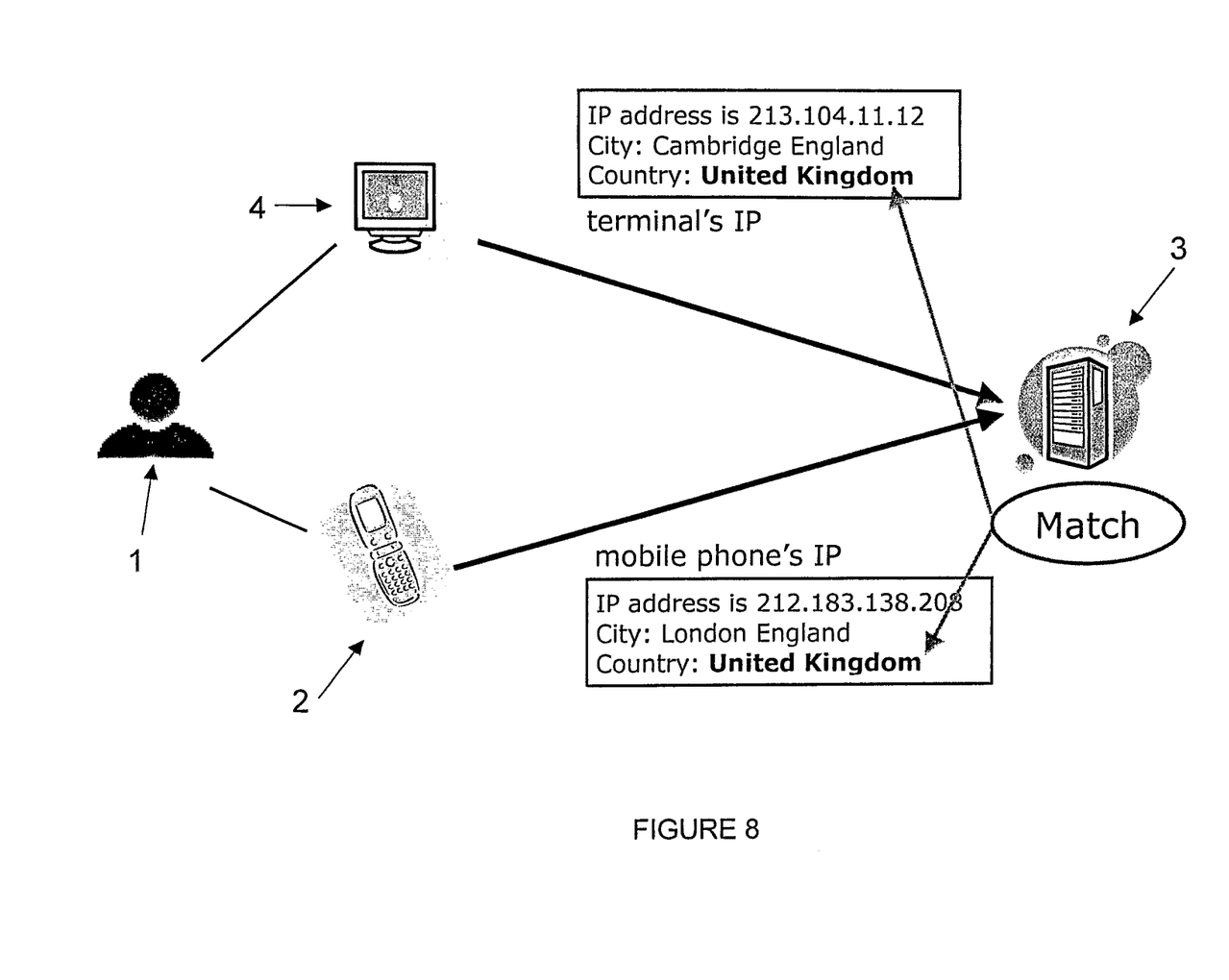
FIG. 8 is a diagram of one example of the present invention.

If the geographic locations of the mobile device 2 and the geographic location of the access terminal 4 are the same, the authentication device 3 will proceed with the authentication method. However, if the geographic locations are different, the authentication device 3 will not continue with the authentication process and the user will not be authenticated. In an alternative example, the authentication server will continue with the authentication of the user but will produce a geographic location failure notification signal which can then be used to alert a third party to the fact that the mobile device 2 appears to be in a different geographic location to that of the authentication device. The above geographic location match can be performed at any time before the user if successfully authenticated.

In another, simpler, example, the geographic location of the mobile device 2 alone can be determined and used for validation. This example of the invention would be particularly suited for application where certain online activity is restricted in specific geographic locations (e.g. online gambling in the United States).

Again, with reference to FIGS. 5 and 6, once the message is received by the authentication device 3, the signed message is decrypted, decoded and then validated. If the signed message is successfully validated by the remote authentication device 3, the user 1 is successfully authenticated. This can be done by, for example, sending an authentication signal to a third party, such as a bank or an online retailer or alternatively, sending an authentication signal to a local client operating on the access terminal 4.

In each embodiment of the present invention, the message which has been decoded and decrypted by the mobile device can be sent to the authentication device 3 any number of times over any period of time. For example, the present invention could be used to distribute a PIN code to a user so that the user could then send the PIN code to the authentication device 3 any number of times such that the user could be authenticated whenever he or she wished.

Now, in reference to FIG. 3, a possible distribution of security items of the authentication system according to the present invention will now be described. When interacting with an access terminal 4, a user 1 may use a personalised magnetic card or smartcard 5. The details of these cards could be registered with the remote authentication device 3 and could constitute, along with a password which would also be registered at the remote authentication device 3, the first authentication factor.

Security between the remote authentication device 3 and the mobile device 2 may be implemented in a variety of ways. One example is asymmetric cryptography where a public cryptographic key would be stored in the remote authentication device 3 and a private key would be stored in the mobile device 2.

Furthermore, information relating to a specific Subscriber Identity Module (SIM) in the mobile device 2 could be stored on the remote authentication device 3 and used as a key to encrypt the randomly generated message.

Finally, the International Mobile Equipment Identity (IMEI) number of the mobile device 2 could be stored on the remote authentication device 3 and used as a key to encrypt the randomly generated message. Thus, only the mobile device 2 with that specific IMEI could decrypt the message.

Figure 9:
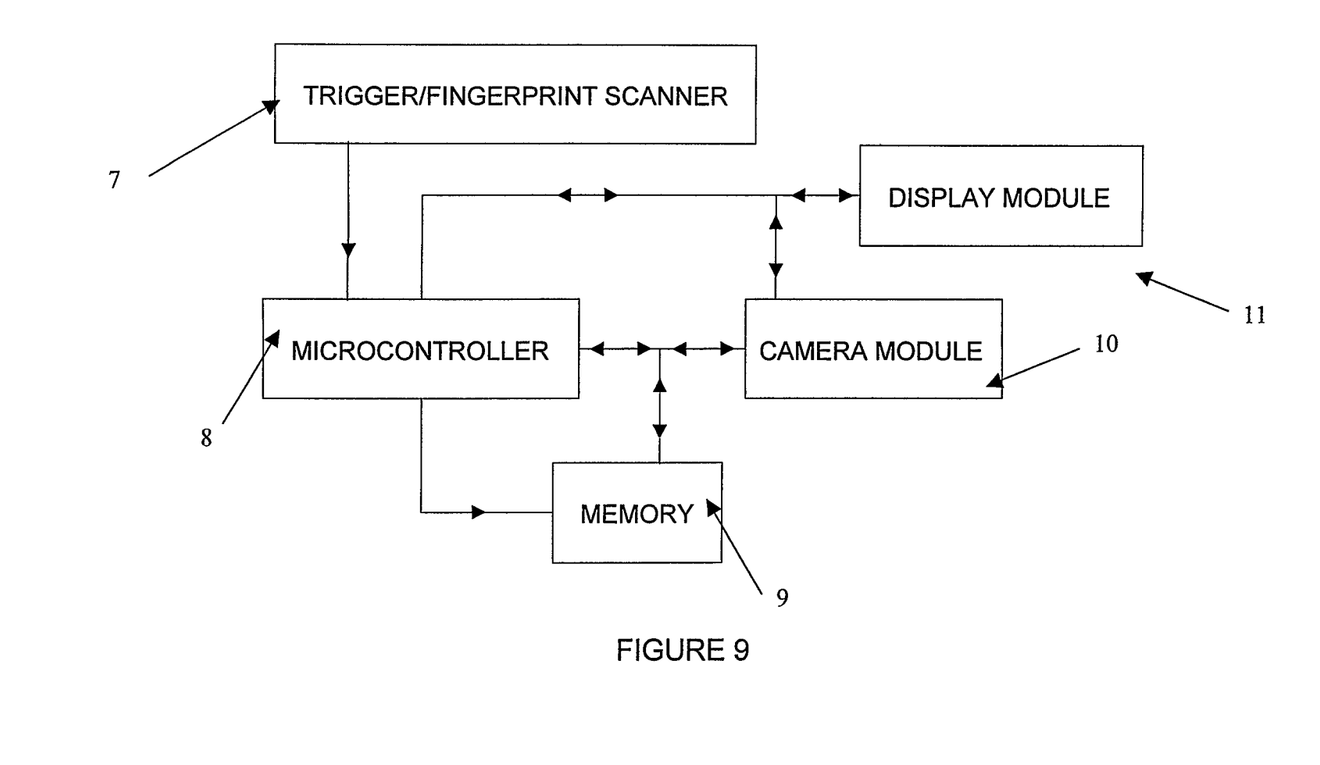
FIG. 9 is a diagram representing a hardware token in accordance with one example of the present invention.

Now, in reference to FIG. 9, although the mobile device of the present can be a mobile phone, it can also be a dedicated hardware token which, for example, comprises a camera module 10 or other optical capturing means, a microcontroller 8 for processing the information input via camera module 10, memory means 9 and a display module 11 for display information to the user. The mobile device may also comprise a finger print scanner 7 for scanning at least a part of a user's finger print. The finger print scanner can also be used as a trigger for actuating at least a part of the mobile device.

The invention claimed is:

1. A method of authenticating a user, the method comprising the steps of:
sending an authentication request to a remote authentication device;
at the remote authentication device, generating a first piece of authentication information based on the received authentication request;
receiving at a mobile device, the first piece of authentication information from an access terminal that is in communication with the remote authentication device, wherein the first piece of authentication information comprises an encrypted message;
generating, within the mobile device of the user, a second piece of authentication information which is at least partially based on the received first piece of authentication information, wherein generating comprises decrypting the encrypted message and including at least a portion of the decrypted message in the second piece of authentication information;
sending the second piece of authentication information to the remote authentication device;
validating the second piece of authentication information; and
if the second piece of authentication information is successfully validated, generating an authentication signal, wherein the first piece of authentication information is presented as an image on a display means of the access terminal and captured therefrom using an optical acquiring means of the mobile device,
wherein the first piece of authentication information contains transactional information related to a transaction which the user wishes to make.

2. The method of claim 1, wherein the first piece of authentication information is captured from the access terminal using a digital camera on the mobile device.

3. The method of claim 1, wherein the step of generating the second piece of authentication information is done using one of International Mobile Equipment Identity (IMEI), information relating to the Subscriber Identity Module (SIM) or information specific to the mobile device of the user.

4. The method of claim 1, wherein the second piece of authentication information comprises biometric data.

5. A system for authenticating a user, the system comprising:
sending means for sending an authentication request to a remote authentication device;
generating means at the remote authentication device for generating a first piece of authentication information based on the authentication request;
receiving means for receiving at a mobile device, the first piece of authentication information from an access terminal that is in communication with the remote authentication device, wherein the first piece of authentication information comprises an encrypted message;

generating means for generating, within the mobile device of the user, a second piece of authentication information which is at least partially based on the received first piece of authentication information, wherein generating comprises decrypting the encrypted message and including at least a portion of the decrypted message in the second piece of authentication information;

sending means for sending the second piece of authentication information to the remote authentication device;

validating means for validating the second piece of authentication information; and generating means for generating an authentication signal if the second piece of authentication information is successfully validated by the validating means, wherein the system is arranged such that the first piece of authentication information is presented as an image on a display means of the access terminal and captured therefrom using an optical acquiring means of the mobile device, wherein the first piece of authentication information contains transactional information related to a transaction which the user wishes to make.

6. The system of claim 5, wherein the system is arranged such that the first piece of authentication information is captured from the access terminal using a digital camera on the mobile device.

7. The system of claim 5, wherein the system is arranged such that the generating means generates the second piece of authentication information using one of the International Mobile Equipment Identity (IMEI), information relating to the Subscriber Identity Module (SIM) or information specific to the mobile device of the user.

8. The system of claim 5, wherein the second piece of authentication information comprises biometric data.

9. The system of claim 5, wherein the mobile device comprises:
an optical input means;
a processing means; and
a display means.

* * * * *